(12) United States Patent
Van Brocklin et al.

(10) Patent No.: US 7,933,191 B2
(45) Date of Patent: Apr. 26, 2011

(54) OPTICAL DISC DRIVE HAVING TWO OPTOMECHANICAL MECHANISMS

(76) Inventors: Andrew L. Van Brocklin, Corvallis, OR (US); David Leigh, Corvallis, OR (US); Greg J. Lipinski, Loveland, CO (US)

(*) Notice: Subject to any disclaimer, the term of this patent is extended or adjusted under 35 U.S.C. 154(b) by 1100 days.

(21) Appl. No.: 11/553,883

(22) Filed: Oct. 27, 2006

(65) Prior Publication Data
US 2008/0101184 A1 May 1, 2008

(51) Int. Cl.
*G11B 17/04* (2006.01)
(52) U.S. Cl. .............. 369/195; 720/605; 720/690
(58) Field of Classification Search .......... 369/195, 369/199, 47.49; 720/601, 605, 610, 690, 720/695, 696
See application file for complete search history.

(56) References Cited

U.S. PATENT DOCUMENTS

| | | | | |
|---|---|---|---|---|
| 4,328,521 A | * | 5/1982 | Pexton et al. | 360/246.4 |
| 4,716,479 A | * | 12/1987 | Sakamoto et al. | 360/246.3 |
| 4,796,118 A | * | 1/1989 | Ohkita et al. | 360/246.3 |
| 5,105,414 A | * | 4/1992 | Funabashi et al. | 720/613 |
| 5,172,370 A | * | 12/1992 | Suzuki | 720/668 |
| 5,191,562 A | * | 3/1993 | Hensing et al. | 369/13.2 |
| 5,251,201 A | * | 10/1993 | Nomura | 369/195 |
| 5,450,379 A | * | 9/1995 | Fujimori et al. | 369/275.1 |
| 5,506,830 A | * | 4/1996 | Ohishi et al. | 720/668 |
| 5,596,563 A | * | 1/1997 | Maeng | 720/668 |
| 5,596,566 A | * | 1/1997 | Taki | 720/728 |
| 2003/0108708 A1 | * | 6/2003 | Anderson et al. | 428/64.4 |
| 2004/0111737 A1 | * | 6/2004 | Masaki et al. | 720/715 |

FOREIGN PATENT DOCUMENTS

JP        05036218 A  *  2/1993

* cited by examiner

*Primary Examiner* — William J Klimowicz
*Assistant Examiner* — Mark L Fischer (57) ABSTRACT

An optical disc device includes a first optomechanical mechanism, a second optomechanical mechanism, and a positioning mechanism. The first optomechanical mechanism is located under an optical disc insertable into the optical disc drive to optically access a bottom surface of the optical disc. The second optomechanical mechanism is located over the optical disc insertable into the optical disc drive to optically access a top surface of the optical disc. The positioning mechanism is to precisely locate the second optomechanical mechanism over the optical disc for optically accessing the top surface of the optical disc and to prevent the second optomechanical mechanism from interfering with movement of the optical disc during insertion and removal of the optical disc into and from the optical disc drive.

10 Claims, 7 Drawing Sheets

OPTICAL DISC DRIVE HAVING TWO OPTOMECHANICAL MECHANISMS

BACKGROUND

Many types of optical discs include a data area and a label area. The data area is where the data is written to, whereas the label area allows the user to label the optical disc. A laser or another type of optical beam can be used to read from and/or write to the data area and the label area of an optical disc. For example, in the patent application entitled "Integrated CD/DVD Recording and Label", filed on Oct. 11, 2001, and assigned Ser. No. 09/976,877, a type of optical disc is disclosed in which a laser or other optical beam can be used to write to the label area of an optical disc.

Conventionally, a user inserts an optical disc into an optical disc drive so that the data area of the optical disc is incident to the optical beam, for optical writing of data to the data side of the optical disc. Thereafter, the user may remove the optical disc from the optical disc drive, flip it over, and reinsert the optical disc into the drive so that the label area of the optical disc is incident to the optical beam, for optical writing of human-readable markings to the label side of the optical disc. However, this process of inserting an optical disc into the optical disc drive, writing data to the disc, removing the disc, flipping the disc over, reinserting the optical disc into the drive, and labeling the disc can be inconvenient.

DETAILED DESCRIPTION

Overview and General Embodiments

Figure 1:
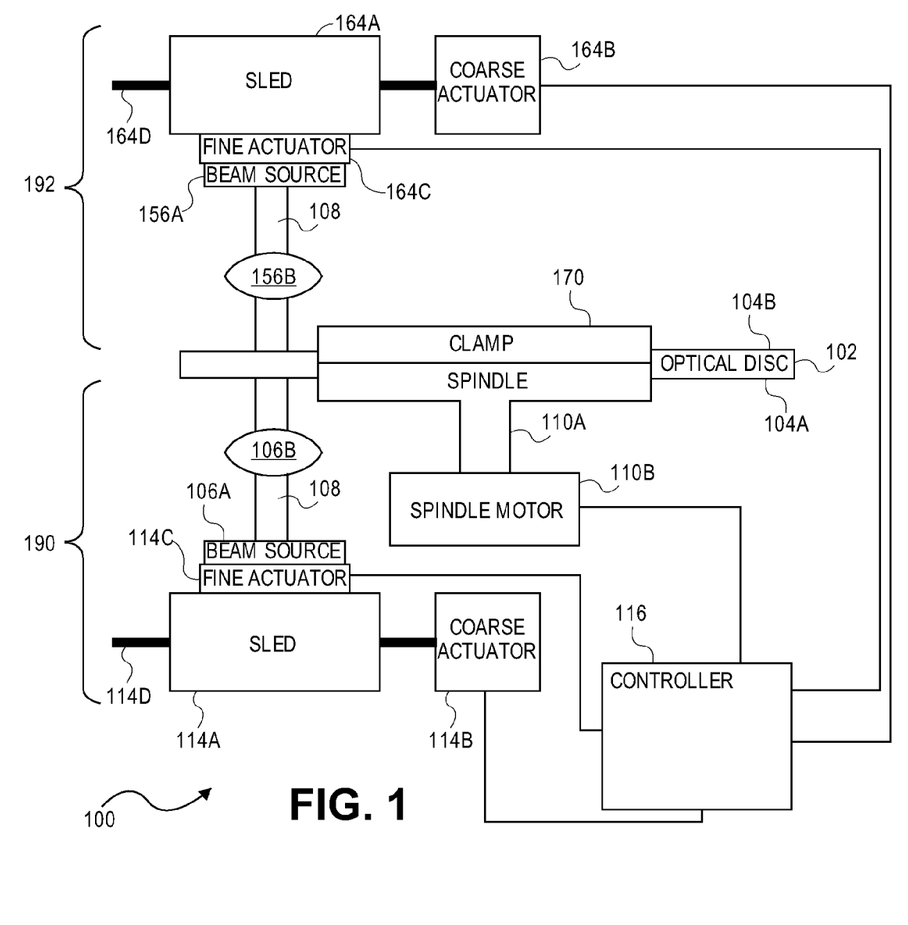
FIG. 1 is a block diagram of a representative optical disc device, according to an embodiment of the invention.

FIG. 1 shows an optical disc device 100, according to an embodiment of the invention. The optical disc device 100 is for reading from and/or writing to an optical disc 102 inserted into the optical disc device 100 and that has a label area and a data area. In one embodiment, the label area of disc 102 is a label side 104B and the data area is a data side 104A opposite the label side 104B. More specifically, the optical disc device 100 is for reading from and/or writing to an optically writable label side 104B of the optical disc 102, and/or an optically writable data side 104A of the optical disc 102, which are collectively referred to as the sides 104 of the optical disc 102.

The optically writable data side 104A of the optical disc 102 includes a data region on which data may be optically written to and/or optically read by the optical disc device 100. The data side 104A is thus the side of the optical disc 102 to which binary data readable by the optical disc device 100 and understandable by a computing device is written, and can be written by the optical disc device 100 itself. For instance, the data side 104A may be the data side of a compact disc (CD), a CD-readable (CD-R), which can be optically written to once, a CD-readable/writable (CD-RW), which can be optically written to multiple times, and so on. The data side 104A may further be the data side of a digital versatile disc (DVD), a DVD-readable (DVD-R), or a DVD that is readable and writable, such as a DVD-RW, a DVD-RAM, or a DVD+RW. The data side 104A may also be the data side of a high-capacity optical disc, such as a Blu-ray optical disc, a High Definition (HD) DVD optical disc, and so on. Furthermore, there may be a data region on each side of the optical disc 102, such that the optical disc is double sided, and such that there is a label region on at least one of the sides of the disc.

The label side 104B is the side of the optical disc 102 to which visible markings can be optically written to realize a desired label image. For instance, the label side 104B may be part of an optical disc that is disclosed in the previously filed patent application assigned Ser. No. 09/976,877, which discloses an optically writable label side of an optical disc. It is noted that in other embodiments at least one of the sides 104A and 104B of the optical disc 102 may have both label regions and data regions.

The optical disc device 100 is depicted in FIG. 1 as including an optomechanical mechanism 190 and an optomechanical mechanism 192. Generally, the optomechanical mechanism 190 is for optically accessing the data side 104A, while the optomechanical mechanism 192 is for optically accessing the label side 104B. Optical accessing in this context can mean optical writing and/or optical reading. For instance, the optomechanical mechanism 190 may be for optically writing data to the data side 104A and/or optically reading data from the data side 104A, whereas the optomechanical mechanism 192 may just be for optically writing a human-readable image to the label side 104B.

The presence of two optomechanical mechanisms 190 and 192 within the optical disc device 100 is advantageous, because it provides for more convenient utilization of the optical disc 102 by a user. For example, the user may insert the optical disc 102 into the optical disc device 100. Once the optical disc 102 has been inserted into the device 100, the user may then control the optical disc device 100, via an attached computing device, for instance, to cause data to be written to the data side 104A by the optomechanical mechanism 190. Thereafter, the user can control the optical disc device 100 to cause human-readable markings to be written to the label side 104B by the optomechanical mechanism 192. That is, because there are two optomechanical mechanisms 190 and 192, the user does not have to remove the optical disc 102 from the device 100, flip it over, and reinsert the disc 102 back into the device 100, after causing data to be written to the data side 104A and before causing data to be written to the label side 104B.

However, it is noted that while embodiments of the invention are substantially described herein in relation to two optomechanical mechanisms 190 and 192, one of which is for writing human-readable markings on the label side 104B and one of which is for writing or reading machine-readable data on the data side 104A, other embodiments of the invention are not so limited. For example, both the optomechanical mechanisms 190 and 192 may be for reading or writing machine-readable data, where both sides 104A and 104B of the optical disc 102 are data sides. Such an embodiment is particularly useful, for instance, in relation to optical discs that store data on both sides. Therefore, it is understood that the description herein that is made in substantial relation to writing human-readable markings on one side of an optical disc and reading or writing machine-readable data on the other side of an optical disc pertains to just one embodiment of the invention, and not all embodiments of the invention.

The optomechanical mechanism 190 includes a beam source 106A and an objective lens 106B, which are collectively referred to as the optical mechanism 106. Similarly, the optomechanical mechanism 192 includes a beam source 156A and an objective lens 156B, which are collectively referred to as the optical mechanism 156. The optical mechanism 106 is particularly described herein, but those of ordinary skill within the art can appreciate that the optical mechanism 156 operates similarly. The primary difference between the optical mechanisms 106 and 156 is that the former is for optically accessing the data side 104A, whereas the latter is for optically accessing the label side 104B.

The beam source 106A generates an optical beam 108 that is focused by the objective lens 106B onto the optical disc 102. In some embodiments the optical beam source 106A may be a laser beam source, such that the optical beam 108 is a laser beam. The optical mechanism 106 may include other components, in addition to and/or in lieu of those depicted in FIG. 1. For example, the optical mechanism 106 may include one or more mirrors, as well as a photodetector, so that reflections of the beam 108 off the optical disc 102 can be directed to the photodetector by the mirrors and detected by the photodetector. As another example, the optical mechanism 106 may include polarizing beam splitters, quarter-wave plates, voice coils, and so on.

The optomechanical mechanism 190 further includes a spindle 110A and a spindle motor 110B, which are collectively referred to as the first motor mechanism 110 of the optomechanical mechanism 190. By comparison, the optomechanical mechanism 192 includes a clamp 170, which may be referred to as a spindle clamp, a disc clamp, or a hub. The optical disc is rotatably situated between the spindle 110A and the clamp 170. The spindle motor 110B rotates the spindle 110A, such that the optical disc 102 correspondingly rotates. The first motor mechanism 110 may include other components besides those depicted in FIG. 1. For instance, the first motor mechanism 110 may include a rotary encoder or another type of encoder to provide for control of the spindle motor 110B and the spindle 110A. In a different embodiment, the optomechanical mechanism 192 may include the first motor mechanism 110, and the optomechanical mechanism 190 may include the clamp 170.

The optomechanical mechanism 190 also includes a sled 114A, a coarse actuator 114B, a fine actuator 114C, and a rail 114D, which are collectively referred to as the second motor mechanism 114 of the optomechanical mechanism 190. Likewise, the optomechanical mechanism 192 includes a sled 164A, a coarse actuator 164B, a fine actuator 164C, and a rail 164D, which are collectively referred to as the motor mechanism 164 of the optomechanical mechanism 192. The motor mechanism 114 is particularly described herein, but those of ordinary skill within the art can appreciate that the motor mechanism 164 operates similarly.

The second motor mechanism 114 moves the optical mechanism 106 to radial locations relative to a surface of the optical disc 102. The sled 114A may also be referred to more generally as a support. The coarse actuator 114B is or includes a motor that causes the sled 114A, and hence the fine actuator 114C and the optical mechanism 106 situated on the sled 114A, to move radially relative to the optical disc 102 on the rail 114D. The coarse actuator 114B thus provides for coarse or large radial movements of the fine actuator 114C and the optical mechanism 106.

By comparison, the fine actuator 114C also is or includes a motor, and causes the optical mechanism 106 to move radially relative to the optical disc 102 on the sled 114A. The fine actuator 114C thus provides for fine or small movements of the optical mechanism 106. The second motor mechanism 114 may include other components besides those depicted in FIG. 1. For instance, the second motor mechanism 114 may include a linear encoder or another type of encoder to provide for control of the coarse actuator 114B and the sled 114A. Furthermore, either or both of the motor mechanisms 110 and 114 may be considered as the movement mechanism of the optomechanical mechanism 190, whereas the motor mechanism 164 may also be considered as the movement mechanism of the optomechanical mechanism 192.

It is noted that the utilization of a fine actuator 114C and a coarse actuator 114B, as part of the second motor mechanism 114, is representative of one, but not all, embodiments of the invention. That is, to radially move the optical mechanism 106 in relation to the optical disc 102, the embodiment of FIG. 1 uses both a fine actuator 114C and a coarse actuator 114B. However, in other embodiments, other types of a second motor mechanism 114 can be used to radially move the optical mechanism 106 in relation to the optical disc 102, which do not require both a fine actuator 114C and a coarse actuator 114B. For instance, a single actuator or other type of motor may alternatively be used to radially move and position the optical mechanism 106 in relation to the optical disc 102.

The optical disc device 100 is finally depicted in FIG. 1 as including a controller 116. The controller 116 may be implemented in software, hardware, or a combination of software and hardware. The controller 116 controls movement of the spindle motor 110B, and thus controls rotation of the optical disc 102 on the spindle 110A, such as the angular velocity of the rotation of the optical disc 102. The controller 116 also controls the coarse actuators 114B and 164B, and thus movement of the sleds 114A and 164A on the rails 114D and 164D, respectively.

The controller 116 further controls the fine actuator 114C (and the fine actuator 164C), and thus movement of the beam sources 106A and 156A on the sleds 114A and 164A, respectively. The controller 116 may further include other components besides those depicted in FIG. 1. For instance, the controller 116 can be responsible for turning on and off, and focusing, the optical beams 108 and 158, via control of the beam sources 106A and 156A and the objective lens 106B and 156B. Furthermore, as can be appreciated by those of ordinary skill within the art, the components depicted in the optical disc device 100 are representative of one embodiment of the invention, and do not limit all embodiments of the invention.

For the optomechanical mechanism 192 in particular to operate properly, it may have to be precisely positioned above the optical disc 102. More specifically, the optical mechanism 156 may have to be precisely positioned above the optical disc 102. At the same time, however, the optomechanical mechanism 192 may have to be movable so that the optical disc 102 is able to be inserted into and removed from the optical disc device 100. Therefore, at least some embodiments of the invention are concerned with precisely locating the optomechanical mechanism 192 over the optical disc 102 for optically accessing the label surface 104B, as well as with preventing the optomechanical mechanism 192 from interfering with movement of the optical disc 102 during insertion into and removal from the optical disc drive 100.

Figure 2A:
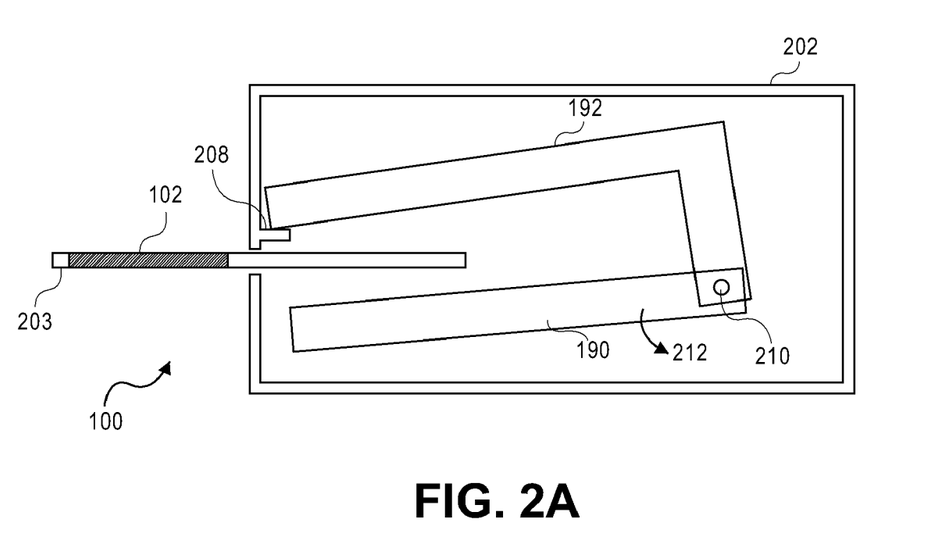
FIG. 2A is a diagram depicting the optical disc device of FIG. 1 in which the tray has been extended for loading or unloading of an optical disc, according to an embodiment of the invention.
Figure 2B:
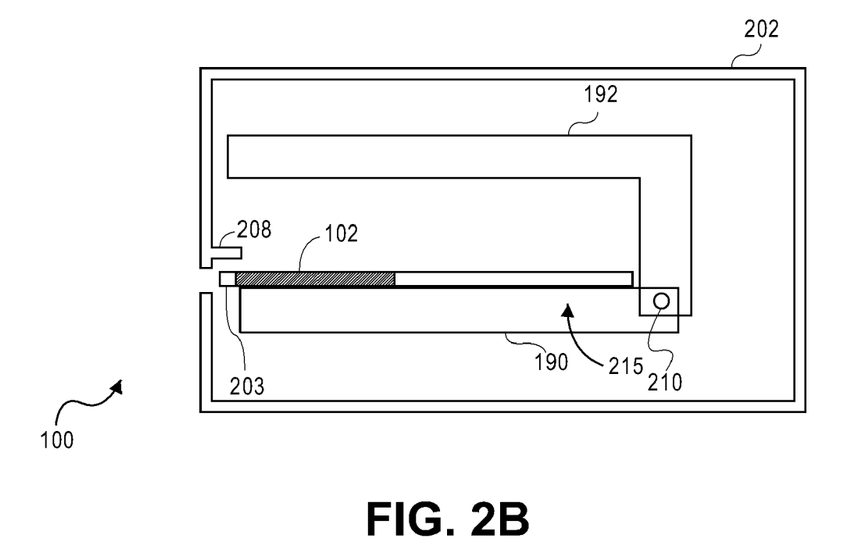
FIG. 2B is a diagram depicting the optical disc device of FIG. 1 in which the tray has been retracted inside the device, according to an embodiment of the invention.

FIGS. 2A and 2B show side profiles of the optical disc device 100 in two different positions, according to an embodiment of the invention. The optical disc device 100 is depicted in FIGS. 2A and 2B as including an enclosure 202 in which the optomechanical mechanisms 190 and 192 are housed. The optomechanical mechanisms 190 and 192 are depicted as rectangular objects within FIGS. 2A and 2B for illustrative convenience only. The enclosure 202 may have a half-height drive form factor, as known within the art, such that the optical disc device 100 is an internal optic disc drive for insertion into a desktop computing device, for example. The enclosure 202 further houses a tray 203 of the optical disc device 100. The tray 203 is substantially extendable from the device 100, and retractable inside the device 100.

The optical disc device 100 in FIGS. 2A and 2B also includes a hinge 210. Either or both the optomechanical mechanisms 190 and 192 are rotatable about the hinge 210, both clockwise and counter-clockwise. That is, the hinge 210 is the pivot point of, and locates, the optomechanical mechanism 192 in relation to the optomechanical mechanism 190. However, the hinge 190 is not necessarily the pivot point of the optomechanical mechanism 190 in relation to the enclosure 202 itself. It can be said that in one embodiment the hinge 210 cooperates with the optomechanical mechanism 190 to rotate the mechanism 190 away from the optical disc 102 and the tray 203 in FIG. 2A, as indicated by the arrow 212, and to rotate the mechanism 190 towards the optical disc 102 and the tray 203 in FIG. 2B, as indicated by the arrow 215. The hinge 210 may further be considered part of a positioning mechanism in one embodiment.

In FIG. 2A more specifically, the tray 203 has been substantially extended from the optical disc device 100, so that the optical disc 102 can be placed on the tray 203. Extending the tray 203 from the optical disc device 100 causes the optomechanical mechanism 190 to slightly rotate counter-clockwise, as indicated by the arrow 212, as is conventional. For instance, those of ordinary skill within the art can appreciate that a rack-and-pinion-type mechanism, or another type of mechanism, such as a cam, may be employed such that as the tray 203 is extended, the optomechanical mechanism 190 rotates slightly counter-clockwise. The angle of rotation of the optomechanical mechanism 190 from its nominal position at least substantially parallel to the tray 203 may be approximately five degrees, such that the rotation of the mechanism 190 in FIG. 2A is exaggerated for illustrative clarity.

Furthermore, in FIG. 2A, the optomechanical mechanism 192 rotates slightly counter-clockwise, as also indicated by the arrow 212, resulting from the tray 203 extending from the optical disc device 100 causing the optomechanical mechanism 190 to rotate in the same direction. However, the optomechanical mechanism 192 is prevented from interfering with movement of the optical disc 102 and the tray 203 during movement of the tray 203 as it extends from (or as it retracts into) the enclosure 202. Particularly, the enclosure 202 includes one or more internal stops 208, against which the optomechanical mechanism 192 makes contact and stops, preventing the mechanism 192 from further rotation and contacting the optical disc 102 and/or the tray 203. The internal stops 208 are particularly depicted in FIG. 2A as being located on the interior of a front surface of the enclosure 202, but in other embodiments, they may be located on the interior of the side surfaces of the enclosure 202, or otherwise located elsewhere.

It can be said that the stops 208 cooperate with the optomechanical mechanism 192 to prevent the mechanism 192 from interfering with movement of the optical disc 102 and the tray 203 during extension of the tray 203 from the enclosure 202, and thus during removal of the optical disc 102 from the device 100. Likewise, the stops 208 cooperate with the optomechanical mechanism 192 to prevent the mechanism 192 from interfering with movement of the optical disc 102 and the tray 203 during retraction of the tray 203 back into the enclosure 202, and thus during insertion of the optical disc 102 into the device 100, as well as during retraction of the tray 203 into the enclosure 202. That is, if the optomechanical mechanism 192 were allowed to continue to rotate, it may contact the tray 203 and/or the optical disc 102 while the former is being extended out of the enclosure 202, such that the mechanism 192 may interfere with the movement of the tray 203 and/or the optical disc 102. The stops 208 may be considered a part of a positioning mechanism in one embodiment. The angle of rotation of the optomechanical mechanism 192 from an imaginary line parallel to the tray 203 in the position of FIG. 2A may be less than one degree—just enough to lift the optomechanical mechanism 192 off the stops 208—such that the rotation of the mechanism 192 in FIG. 2A is exaggerated for illustrative clarity.

In FIG. 2B more specifically, the tray 203 has been retracted back inside the optical disc device 100, with the optical disc 102 thereon. Retraction of the tray 203 into the optical disc device 100 causes the optomechanical mechanism 192 to slightly rotate clockwise, as indicated by the arrow 215, as again is conventional. The optomechanical mechanism 190 may, therefore, be substantially parallel to the optical disc 102 and the tray 203. Furthermore, in FIG. 2B, the optomechanical mechanism 192 rotates slightly clockwise, as also indicated by the arrow 215, resulting from the rotation of the optomechanical mechanism 190, which itself results from the tray 203 retracting inside the optical disc device 100. The angle of rotation of the optomechanical mechanism 192 from an imaginary line parallel to the tray 203 in the position of FIG. 2B may be less than one degree, such that the rotation of the mechanism 192 in FIG. 2B is exaggerated for illustrative clarity. Two different approaches by which rotation of the optomechanical mechanism 190 can cause the optomechanical mechanism 192 likewise rotate are described later in the detailed description.

The reason why the optomechanical mechanism 192 is rotated slightly clockwise can in one embodiment be to precisely locate the optomechanical mechanism 192 relative to the optical disc 102 so that the mechanism 192 can properly optically access the optical disc 102. The position in which the optomechanical mechanism 192 is located in FIG. 2A may be sufficient to prevent the mechanism 192 from interfering with movement of the optical disc 102 and the tray 203, but may not precisely locate the optomechanical mechanism 192 relative to the optical disc 102 for the mechanism 192 sufficiently to properly optically access the optical disc 102. Therefore, the optomechanical mechanism 192 is rotated slightly clockwise from the less precise position of FIG. 2A to the more precise position of FIG. 2B, resulting from movement of the tray 203 back into the enclosure 202, so that the mechanism 192 is able to properly access the optical disc 102. That is, the position of the optomechanical mechanism 192 in FIG. 2B is sufficiently precise in this respect, in contradistinction to the position of the mechanism 192 in FIG. 2A.

When the tray 203 extends from the position of FIG. 2B to the position of FIG. 2A, the optomechanical mechanism 192 is no longer maintained in the position of FIG. 2B, and rotates counter-clockwise until it rests on the stops 208. For instance, gravity may cause the mechanism 192 to naturally rotate downwards. Alternatively, the hinge 210 may be a spring-loaded hinge, which forces the mechanism 192 to rotate counter-clockwise unless and until the mechanism 192 is maintained in a particular position. When the tray 203 retracts from the position of FIG. 2A to the position of FIG. 2B, the optomechanical mechanism 192 is forced from the position of FIG. 2A to the position of FIG. 2B by one of two approaches, as described in more detail later in the detailed description. Both when the optomechanical mechanism 192 is rotating counter-clockwise and when it is rotating clockwise, its point of rotation is the hinge 210.

General Embodiments of Approaches to Rotate Optomechanical Mechanism

Figure 3A:
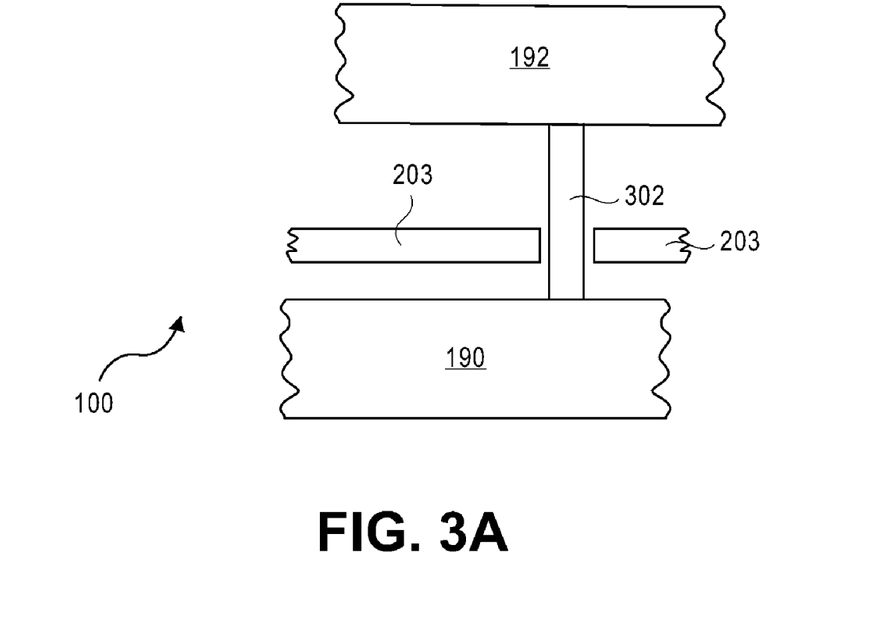
FIGS. 3A and 3B are diagrams depicting two approaches to move one of the optomechanical mechanisms of the optical disc device of FIG. 1 between the position of FIG. 2A and the position of FIG. 2B, according to varying embodiments of the invention.

FIG. 3A shows a portion of the optical disc device 100 in more detail in the position of FIG. 2B, according to an embodiment of the invention. One or more supports 302 are affixed to the first optomechanical mechanism 190. When the optomechanical mechanism 190 rotates clockwise from the position of FIG. 2A to the position of FIG. 2B, the supports 302 extend or fit through corresponding holes within the tray 203, and contact and push against the optomechanical mechanism 192, rotating the optomechanical mechanism 192 from the position of FIG. 2A to the position of FIG. 2B. Thus, the supports 302 are one approach by which clockwise rotation of the optomechanical mechanism 190 can cause the optomechanical mechanism 192 to likewise rotate clockwise. The supports 302 fit within the holes of the tray 203 upon retraction of the tray into the optical disc drive 100.

In one embodiment, at least the tips of the supports 302 are magnetized, so that they are attracted to the optomechanical mechanism 192. The corresponding locations of the optomechanical mechanism 192 at which the tips of the supports 302 contact the mechanism 192 may be magnetized in an opposite polarity, or may be constructed from a material, such as a metal, that is receptive to forces of magnetization. The supports 302 may be considered part of a positioning mechanism in one embodiment. It can be said that the supports 302 cooperate with the optomechanical mechanism 192 to precisely locate the mechanism 192 over the optical disc 102 for optically accessing the optical disc 102.

Figure 3B:
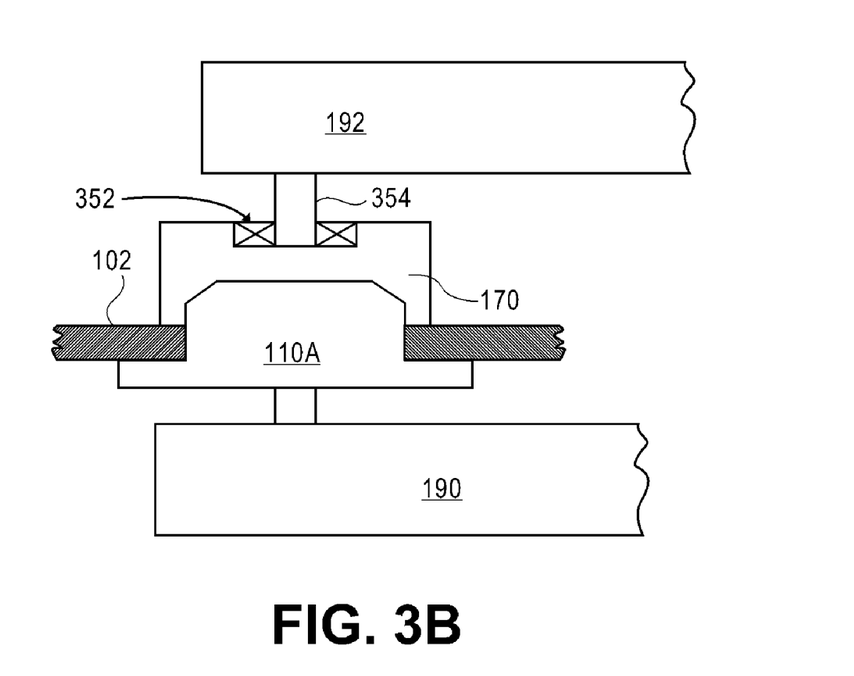

FIG. 3B shows a portion of the optical disc device 100 in more detail in the position of FIG. 2B, according to another embodiment of the invention. The spindle 110A of the optomechanical mechanism 190 and the corresponding clamp 170 of the optomechanical mechanism 192 are particularly called out in FIG. 3B. The clamp 170 is mounted to a radial bearing 352 that is mounted on a shaft 354 so that the clamp 170 is able to freely rotate around the shaft 354. When the optomechanical mechanism 190 rotates clockwise from the position of FIG. 2A to the position of FIG. 2B, the spindle 110A contacts and pushes against the clamp 170, resulting in rotation of the optomechanical mechanism 192, via the shaft 354, from the position of FIG. 2A to the position of FIG. 2B. The bearings 352 and the shaft 354 are another approach by which clockwise rotation of the optomechanical mechanism 190 can cause the optomechanical mechanism 192 to likewise rotate clockwise.

Upon insertion of the optical disc 102 into the optical disc drive 100, then, the spindle 110A contacts the clamp 170, rotating the optomechanical mechanism 192 via the shaft 354. The optical disc 102 is rotatably clamped between the spindle 110A and the clamp 170, in that the bearings 354 permit rotation of the clamp 170, and therefore rotation of the optical disc 102 clamped between the spindle 110A and the clamp 170. The bearings 352 and the shaft 354 may be considered part of a positioning mechanism in one embodiment. It can be said that the bearings 352 and the shaft 354 cooperate with the spindle 110A (via the clamp 170) to precisely locate the optomechanical mechanism 192 over the optical disc 102 for optically accessing the disc 102.

Specific Embodiments of Optical Disc Device and Rotation Approaches

Figure 4A:
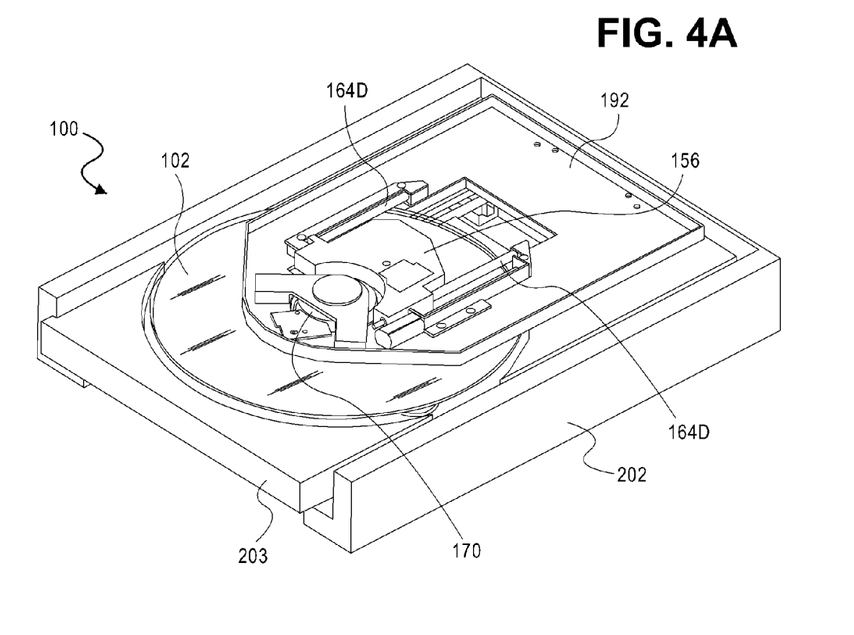
FIGS. 4A and 4B are perspective view diagrams of the optical disc device of FIG. 1 and the underside of one of the optomechanical mechanisms of this optical disc device, according to a specific embodiment of the invention.

In the previous sections of the detailed description, general embodiments of the optical disc device 100 and of approaches to rotate the optomechanical mechanism 192 have been depicted and described. By comparison, FIG. 4A shows a perspective view of the optical disc device 100 in detail, according to a specific embodiment of the invention. Reference number 192 references a portion of the optomechanical mechanism 192. Of the optomechanical mechanism 192, the clamp 170, the optical mechanism 156, and rails 164D are specifically called out and visible in FIG. 4A. Likewise, the enclosure 202, the tray 203, and the optical disc 102 are specifically called out and visible in FIG. 4A.

Figure 4B:
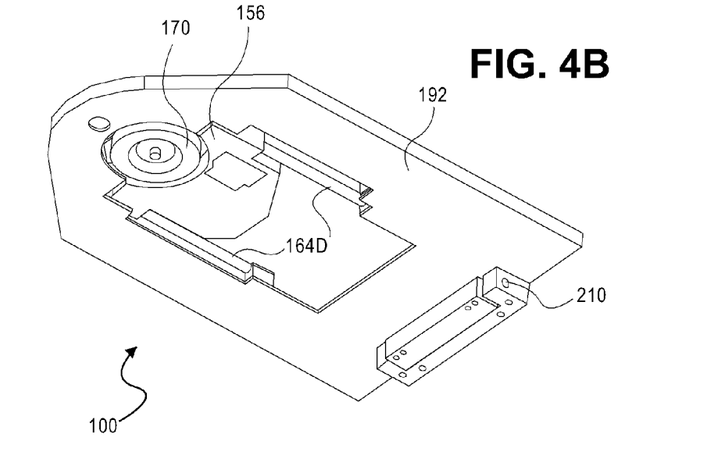

FIG. 4B shows a perspective view of the underside of just the optomechanical mechanism 192 of the optical disc device 100 in detail, according to a specific embodiment of the invention. As in FIG. 4A, reference number 192 references a portion of the optomechanical mechanism 192. Of the optomechanical mechanism 192, the underside of the clamp 170, the optical mechanism 156, and the rails 164D are specifically called out and visible in FIG. 4B. The hinge 210 is also called out and visible in FIG. 4B. Particularly, the hinge 210 may be implemented as a post or rail insertable into corresponding holes of the optomechanical mechanism 192, and about which the mechanism 192 is rotatable. The hinge 210 may be spring-assisted in one embodiment to default the optomechanical mechanism 192 to the position of FIG. 2A where no other mechanism is causing the mechanism 192 to be in the position of FIG. 2B.

Figure 5A:
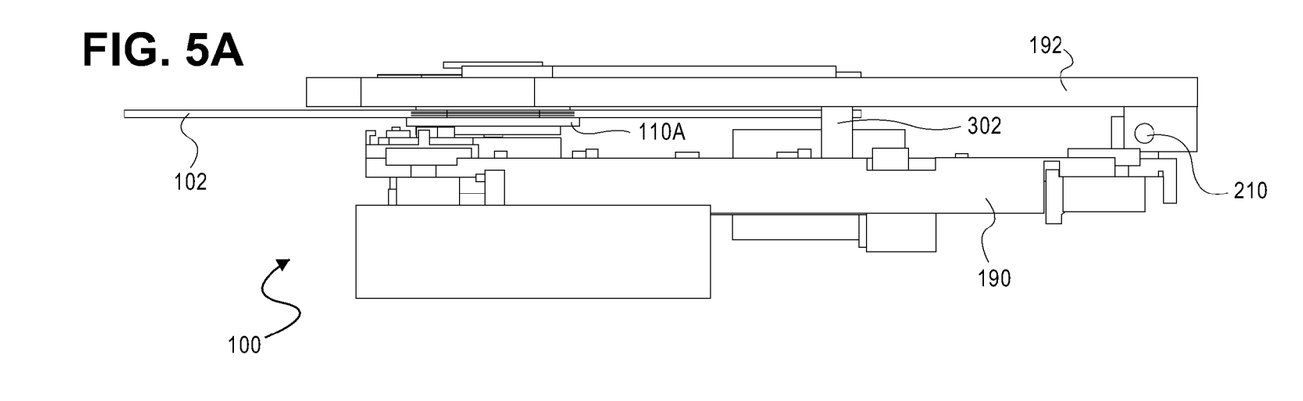
FIGS. 5A and 5B are side view and perspective view diagrams, respectively, of the optical disc device of FIG. 1 in which the approach of FIG. 3A is employed to move one of the optomechanical mechanisms of this optical disc device between the position of FIG. 2A and the position of FIG. 2B, according to a specific embodiment of the invention.

FIG. 5A shows a side view of the optical disc device 100 in which the optomechanical mechanism 192 is moved between the two positions of FIGS. 2A and 2B via the approach of FIG. 3A, in detail, according to a specific embodiment of the invention. Reference number 192 references a portion of the optomechanical mechanism 192. Reference number 190 references a portion of the optomechanical mechanism 190. Of the optomechanical mechanism 190, the spindle 110A is specifically called out and visible in FIG. 5A. Furthermore, the optical disc 102 and the hinge 210 are specifically called out and visible in FIG. 5A.

Also particularly depicted in FIG. 5A are the supports 302. There may be two such supports 302 in one embodiment, where just one is depicted in FIG. 5A. The supports 302 are affixed to the optomechanical mechanism 190, and, where the tray 203 is retracted within the optical disc drive 100 as is shown in FIG. 5A, push and rotate the optomechanical mechanism 192 to the position of FIG. 5A, which is the same position as in FIG. 2B. However, the angle at which the optomechanical mechanism 192 is situated relative to an imaginary line parallel to the tray 203 is not exaggerated in FIG. 5A as it is in FIG. 2B.

Figure 5B:
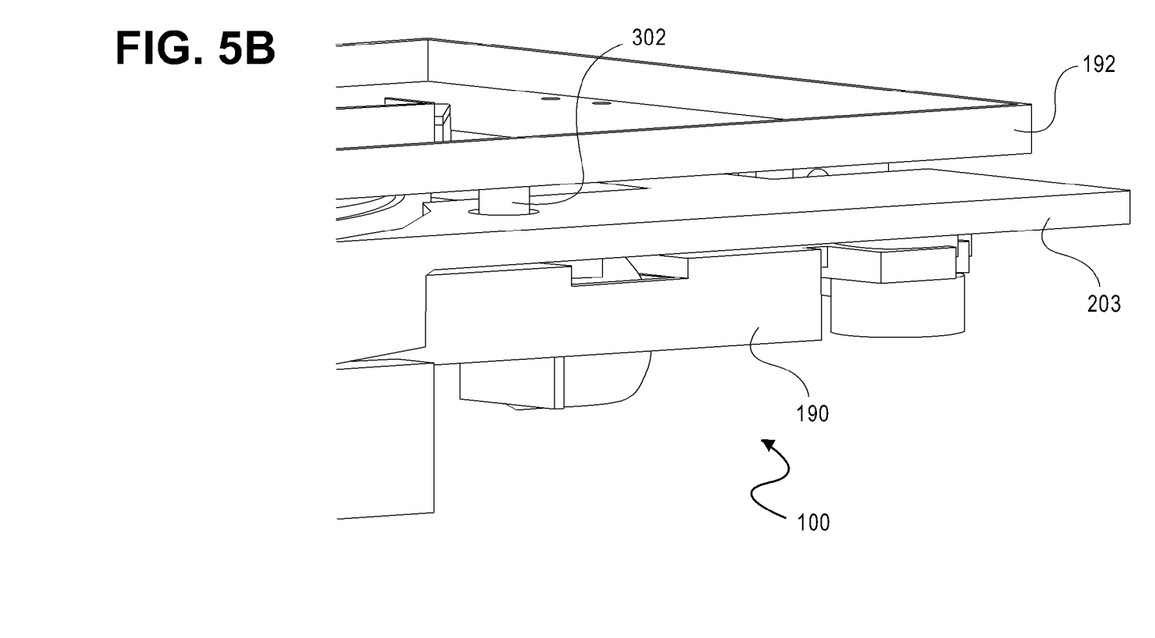

FIG. 5B shows a perspective view of the optical disc device 100 in which the optomechanical mechanism 192 is moved between the two positions of FIGS. 2A and 2B via the approach of FIG. 3A, in more detail, according to a specific embodiment of the invention. As before, reference number 192 references a portion of the optomechanical mechanism 192, and reference number 190 references a portion of the optomechanical mechanism 190. The tray 203 is also specifically called out and visible in FIG. 5B. FIG. 5B specifically shows how the supports 302, which may be posts in one embodiment, as affixed to the optomechanical mechanism 190 are fitted through corresponding holes within the tray 203 to come into contact with the optomechanical mechanism 192. Thus, the position of the optomechanical mechanism 192 in FIG. 5B is the same as that in FIGS. 2B and 5A.

Figure 6A:
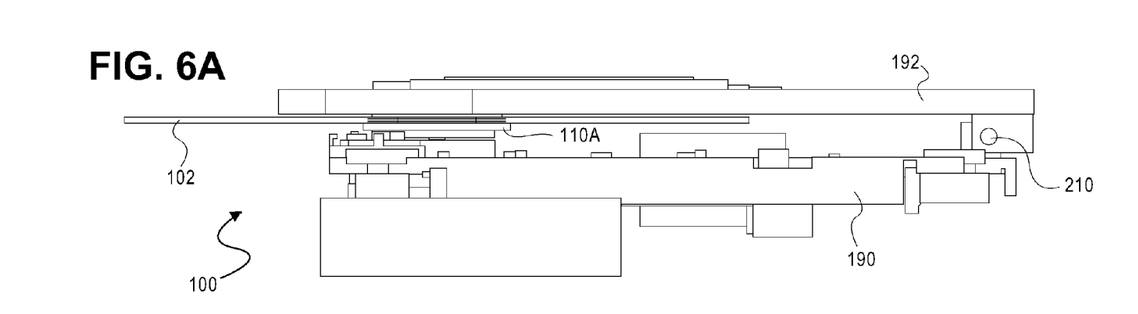
FIGS. 6A and 6B are side view and perspective view diagrams, respectively, of the optical disc device of FIG. 1 in which the approach of FIG. 3B is employed to move one of the optomechanical mechanisms of this optical disc device between the position of FIG. 2A and the position of FIG. 2B, according to a specific embodiment of the invention.

FIG. 6A shows a side view of the optical disc device 100 in which the optomechanical mechanism 192 is moved between the two positions of FIGS. 2A and 2B via the approach of FIG. 3B, in detail, according to a specific embodiment of the invention. Reference number 192 references a portion of the optomechanical mechanism 192. Reference number 190 references a portion of the optomechanical mechanism 190. Of the optomechanical mechanism 190, the spindle 110A is specifically called out and visible in FIG. 6A. Furthermore, the optical disc 102 and the hinge 210 are specifically called out and visible in FIG. 6A.

Not specifically depicted in FIG. 6A is that there are bearings 352 mounted to the underside of the clamp 170, such that the spindle 110A makes contact with the bearings 352 in FIG. 6A. That is, where the tray 203 is retracted within the optical disc drive 100 as is shown in FIG. 6A, the spindle 110A pushes and rotates the optomechanical mechanism 192 to the position of FIG. 6A, which is the same position as in FIG. 2B. However, the angle at which the optomechanical mechanism 192 is situated relative to an imaginary line parallel to the tray 203 is not exaggerated in FIG. 6A as it is in FIG. 2B.

Figure 6B:
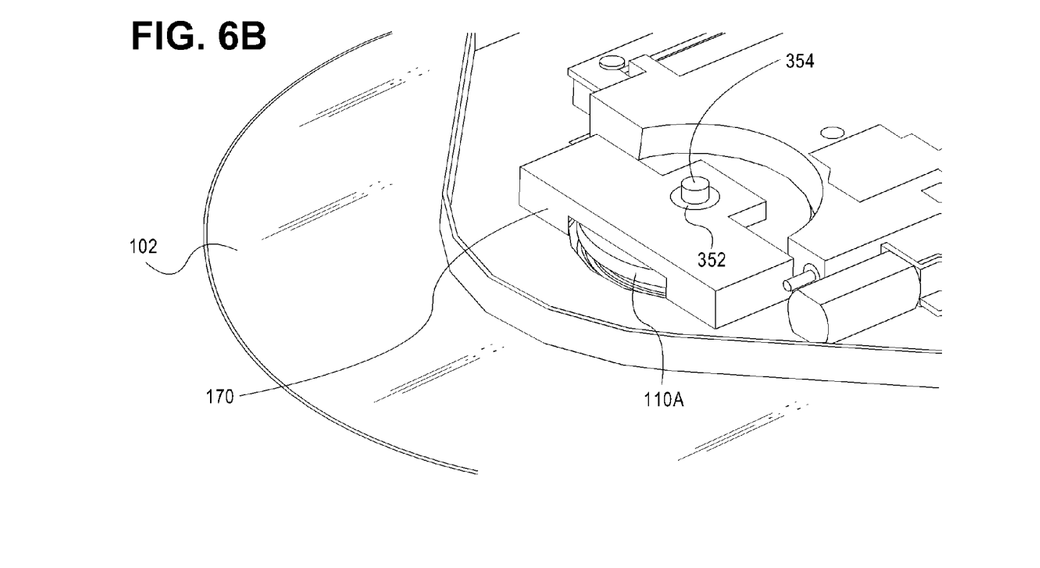

FIG. 6B shows a perspective view by which the optomechanical mechanism 192 of the optical disc device 100 is moved between the two positions of FIGS. 2A and 2B via the approach of FIG. 3B, in more detail, according to a specific embodiment of the invention. However, except for the clamp 170, the optomechanical mechanism 192 is not particularly shown in FIG. 6B for illustrative clarity. The mechanism 192 in actuality would be attached to the top of the shaft 354. The bearings 352 and the shaft 354 are shown situated within the clamp 170 in the embodiment of FIG. 6B. Therefore, when the spindle 110A makes contact with the clamp 170, the clamp 170 pushes against the shaft 354, resulting in the portion of the optomechanical mechanism 192 not visible in FIG. 6B to rise. The spindle 110A and the clamp 170 are still permitted to rotate, due to the bearings 352 movably fitting around, and thus rotating around, the shaft 354.

Method and Concluding General Embodiment

Figure 7:
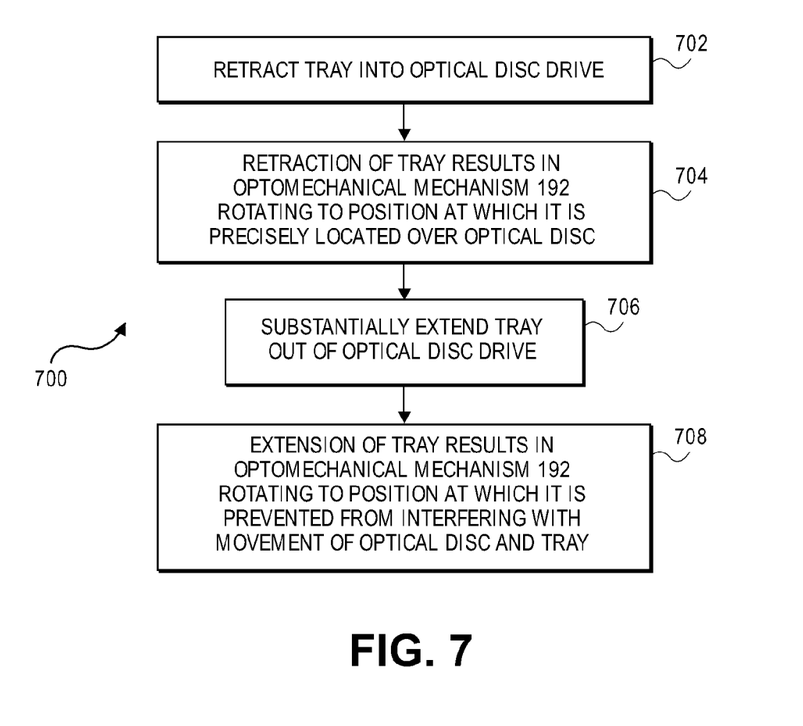
FIG. 7 is a flowchart of a method for moving one of the optomechanical mechanisms of the optical disc device of FIG. 1 between the position of FIG. 2A and the position of FIG. 2B, according to an embodiment of the invention.

FIG. 7 shows a method 700 performable in relation to the optical disc device 100 that has been described, according to an embodiment of the invention. The tray 203 of optical disc device 100 is retracted into the device 100 (702), from the position of FIG. 2A to the position of FIG. 2B. The optical disc 102 may have been placed on the tray 203 prior to retraction of the tray 203 within the optical disc device 100. Retraction of the tray 203 within the optical disc device 100 results in the optomechanical mechanism 192 rotating to a position at which it is precisely located over the optical disc 102 for optically accessing the label side 104B of the optical disc (704). For instance, as has been described in relation to FIG. 3A, the supports 302 affixed to the optomechanical mechanism 190 extend through the holes within the tray 203, such that the supports 302 push against the optomechanical mechanism 192 and rotate the optomechanical mechanism 192 clockwise to the position of FIG. 2B. As another example, as has been described in relation to FIG. 3B, the spindle 110A pushes against the clamp 170, which pushes against the shaft 354, which rotates the optomechanical mechanism 192 clockwise to the position of FIG. 2B, while the clamp 170 is still permitted to rotate due to the bearings 352.

Thereafter, the tray 203 of the optical disc device 100 may be substantially extended out of the device 100 (706), from the position of FIG. 2B to the position of FIG. 2A. Extension of the tray 203 out of the optical disc device 100 results in the optomechanical mechanism 192 rotating to a position in which it is prevented from interfering with movement of the optical disc 102 and the tray 203 (708). For instance, the optomechanical mechanism 192 freely or by the force of a spring-loaded hinge 210 rotates counter-clockwise to the position of FIG. 2A, where there is no other mechanism, such as the supports 302 or the bearings 352 to maintain the mechanism 192 in the position of FIG. 2B.

The optomechanical mechanism 192 thus ultimately rests on the stops 208 of FIG. 2A, where it is prevented from interfering with movement of the optical disc 102 and the tray 203. That is, if the optomechanical mechanism 192 were allowed to continue to rotate counter-clockwise, and not have its rotation stopped by the stops 208, it ultimately may come into contact with the optical disc 102 and/or the tray 203. Such contact between the optomechanical mechanism 192 and the optical disc 102 and/or the tray 203 may affect the movement of the disc 102 and/or the tray 203 as the latter is extended out of the enclosure 202 of the optical disc device 100. Therefore, the stops 208 prevent the optomechanical mechanism 192 from interfering with movement of the optical disc 102 and the tray 203.

Figure 8:
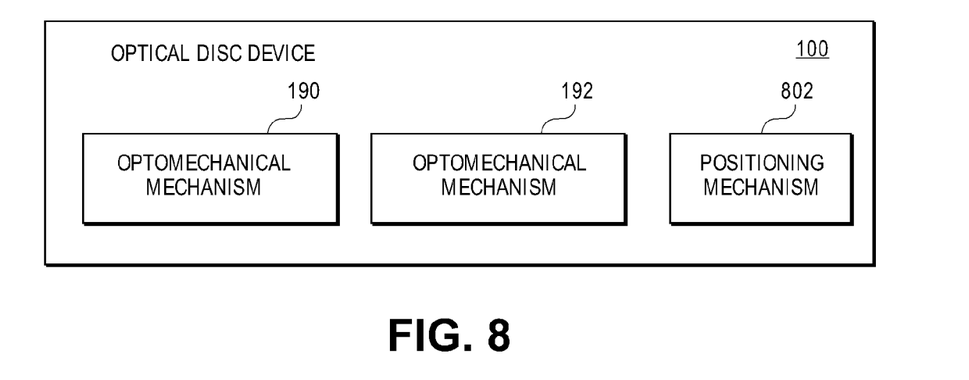
FIG. 8 is a rudimentary block diagram of the optical disc device of FIG. 1, according to an embodiment of the invention.

FIG. 8 shows a concluding rudimentary block diagram of the optical disc device 100 that has been described, according to an embodiment of the invention. The optical disc device 100 is depicted as including the optomechanical mechanisms 190 and 192 that have been described, as well as a positioning mechanism 802. As can be appreciated by those of ordinary skill within the art, the device 100 may include other components, in addition to and/or in lieu of those depicted in FIG. 8. For instance, the optical disc device 100 may include the controller 116 that has been described in relation to FIG. 1, and/or other components and/or mechanisms.

The positioning mechanism 802 performs two functions. First, the mechanism 802 precisely locates the optomechanical mechanism 192 over the optical disc 102 for optically accessing the label side 104B of the optical disc 102. Second, the mechanism 802 prevents the optomechanical mechanism 192 from interfering with movement of the optical disc 102 and/or the tray 203 during insertion and removal of the optical disc 102 into and from the optical disc drive 100, via corresponding retraction and retraction of the tray 203. In one embodiment, the positioning mechanism 802 may include the hinge 210, the stops 208, and the supports 302 that have been described. In another embodiment, the positioning mechanism 802 may include the hinge 210, the stops 208, and the bearings 352 that have been described. The positioning mechanism 802 may further include other components, in addition to and/or in lieu of the hinge 210, the stops 208, and the supports 302, to achieve its functionality.

We claim:

1. An optical disc device comprising:
   a first optomechanical mechanism located under an optical disc insertable into the optical disc device to optically access a bottom surface of the optical disc;
   a second optomechanical mechanism located over the optical disc insertable into the optical disc device to optically access a top surface of the optical disc;
   a positioning mechanism to precisely locate the second optomechanical mechanism over the optical disc for optically accessing the top surface of the optical disc and to prevent the second optomechanical mechanism from interfering with movement of the optical disc during insertion and removal of the optical disc into and from the optical disc device; and,
   one of:
      one or more supports affixed to the first optomechanical mechanism extending through one or more corresponding holes of a tray to push and rotate the second optomechanical mechanism to a position over the optical disc at which the second optomechanical mechanism is precisely located over the optical disc for optically accessing the top surface of the optical disc; and,
      a spindle contacting a clamp to push a shaft to which the second optomechanical mechanism is attached to rotate the second optomechanical mechanism to the position over the optical disc at which the second optomechanical mechanism is precisely located over the optical disc for optically accessing the top surface of the optical disc.

2. The optical disc device of claim 1, wherein the second optomechanical mechanism has:
   a first position over the optical disc at which the second optomechanical mechanism is precisely located over the optical disc for optically accessing the top surface of the optical disc, and
   a second position over the optical disc at which the second optomechanical mechanism is prevented from interfering with movement of the optical disc during insertion and removal of the optical disc into and from the optical disc device,
   the first position located further away from the top surface of the optical disc than the second position is located away from the top surface of the optical disc.

3. The optical disc device of claim 1, wherein the positioning mechanism comprises a hinge, the hinge cooperating with the second optomechanical mechanism to enable the second optomechanical mechanism to rotate towards and away from the optical disc insertable into the optical disc device.

4. The optical disc device of claim 1, wherein the positioning mechanism comprises one or more stops, the stops cooperating with the second optomechanical mechanism to prevent the second optomechanical mechanism from interfering with movement of the optical disc during insertion and removal of the optical disc into and from the optical disc device.

5. The optical disc device of claim 1, further comprising an enclosure in which the first optomechanical mechanism, the second optomechanical mechanism, and the positioning mechanism are housed, the enclosure having a half-height drive form factor.

6. The optical disc device of claim 1, wherein the first optomechanical mechanism is adapted to optically read data from the bottom surface of the optical disc and optically write data to the bottom surface of the optical disc, and the second optomechanical mechanism is adapted to at least optically write human-readable markings to the top surface of the optical disc.

7. An optical disc device comprising:
   first optomechanical means for optically accessing a bottom surface of an optical disc insertable into the optical disc device;
   second optomechanical means for optically accessing the top surface of the optical disc insertable into the optical disc device;
   positioning means for precisely locating the second optomechanical means over the optical disc for optically accessing the top surface of the optical disc and for preventing the second optomechanical means from interfering with movement of the optical disc during insertion and removal of the optical disc into and from the optical disc device;
   one of:
      one or more supports affixed to the first optomechanical means extending through one or more corresponding holes of a tray to push and rotate the second optomechanical means to a position over the optical disc at which the second optomechanical means is precisely located over the optical disc for optically accessing the top surface of the optical disc; and,
      a spindle contacting a clamp to push a shaft to which the second optomechanical means is attached to rotate the second optomechanical means to the position over the optical disc at which the second optomechanical means is precisely located over the optical disc for optically accessing the top surface of the optical disc.

8. The optical disc device of claim 7, wherein the second optomechanical means has:
   a first position over the optical disc at which the second optomechanical means is precisely located over the optical disc for optically accessing the top surface of the optical disc, and
   a second position over the optical disc at which the second optomechanical means is prevented from interfering with movement of the optical disc during insertion and removal of the optical disc into and from the optical disc device,
   the first position located further away from the top surface of the optical disc than the second position is located away from the top surface of the optical disc.

9. A method comprising:
   retracting a tray of an optical disc device into the optical disc device, an optical disc having been placed on the tray, the optical disc device having a first optomechanical mechanism to optically access a bottom surface of the optical disc and a second optomechanical mechanism to optically access a top surface of the optical disc; and,
   retraction of the tray into the optical disc device resulting in the second optomechanical mechanism rotating to a position at which the second optomechanical mechanism is precisely located over the optical disc for optically accessing the top surface of the optical disc,
   wherein retraction of the tray into the optical disc device resulting in the second optomechanical mechanism rotating to the position at which the second optomechanical mechanism is precisely located over the optical disc for optically accessing the top surface of the optical disc comprises one of:
one or more supports affixed to the first optomechanical mechanism extending through one or more corresponding holes of the tray to push and rotate the second optomechanical mechanism to the position over the optical disc at which the second optomechanical mechanism is precisely located over the optical disc for optically accessing the top surface of the optical disc; and,
a spindle of the first optomechanical mechanism contacting a clamp to push a shaft to which the second optomechanical mechanism is attached to rotate the second optomechanical mechanism to the position over the optical disc at which the second optomechanical mechanism is precisely located over the optical disc for optically accessing the top surface of the optical disc.

10. The method of claim 9, further comprising substantially extending the tray out of the optical disc device,
wherein extension of the tray out of the optical disc device results in the second optomechanical mechanism rotating to a position at which the second optomechanical mechanism is prevented from interfering with movement of the optical disc and the tray in that the second optomechanical mechanism is prevented from rotating in such a way as to block an opening of the optical disc device through which the optical disc is inserted into and removed from the optical disc device,
and wherein the second optomechanical mechanism rotates towards the optical disc and the tray and rests upon one or more stops such that further rotation of the second optomechanical mechanism towards the optical disc and the tray is prevented, therefore preventing the second optomechanical mechanism from interfering with movement of the optical disc and the tray.

* * * * *